US010962059B2

(12) United States Patent
Le Duc et al.

(10) Patent No.: US 10,962,059 B2
(45) Date of Patent: Mar. 30, 2021

(54) BEARING WITH AN ECCENTRIC SEAL GROOVE

(71) Applicant: Hamilton Sundstrand Corporation, Charlotte, NC (US)

(72) Inventors: Zachary Allen Ray Le Duc, Rockford, IL (US); David Wakefield, Loves Park, IL (US); Toby Chris Whitehead, Winnebago, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/443,322

(22) Filed: Jun. 17, 2019

(65) Prior Publication Data

US 2020/0392997 A1 Dec. 17, 2020

(51) Int. Cl.
| | | |
|---|---|---|
| *F16C 33/74* | (2006.01) | |
| *F16C 33/10* | (2006.01) | |
| *F01D 25/16* | (2006.01) | |
| *F01D 25/18* | (2006.01) | |
| *F16H 1/08* | (2006.01) | |

(Continued)

(52) U.S. Cl.
CPC ............ *F16C 33/74* (2013.01); *F01D 25/164* (2013.01); *F01D 25/183* (2013.01); *F04C 15/0026* (2013.01); *F16C 33/10* (2013.01); *F16J 15/002* (2013.01); *F16C 2360/00* (2013.01)

(58) Field of Classification Search
CPC ...... F16C 17/26; F16C 33/10; F16C 33/1065; F16C 33/1085; F16C 33/74; F16C 2360/00; F16J 15/002; F01D 25/20; F01D 25/164; F01D 25/183; F04C 2/18; F04C 15/0026; F04C 15/0042; F04C 2240/56; F04D 2240/50; F16H 1/106; F16H 1/08; F16H 1/006; F02C 2/08
USPC ....... 384/130, 143, 152, 286, 397–398, 151, 384/283; 417/203; 418/132, 201.1, 418/206.6–206.7, 135, 143
See application file for complete search history.

(56) References Cited

U.S. PATENT DOCUMENTS 2,881,704 A * 4/1959 Murray ............... F04C 15/0026
417/203
3,029,739 A * 4/1962 Nagely ............... F04C 15/0042
418/73

(Continued)

FOREIGN PATENT DOCUMENTS

| CN | 207161702 U | 3/2018 |
|---|---|---|
| DE | 102015210004 A1 | 12/2016 |

(Continued)

OTHER PUBLICATIONS

Extended European search report issued in corresponding EP application No. 19211135.9, dated Jul. 3, 2020.

*Primary Examiner* — Marcus Charles
(74) *Attorney, Agent, or Firm* — Locke Lord LLP; Scott D. Wofsy; Georgi Korobanov

(57) ABSTRACT

A pump bearing for use in a gear pump including a top face, a side face perimetrically surrounding the top face, a bottom face opposed to the top face, a first bearing bore projecting from the top face to the bottom face defining an axis and configured to contain a drive-side shaft, and a groove within the side face located between the top face and the bottom face a variable depth in a direction perpendicular to the axis configured to a receive seal.

19 Claims, 4 Drawing Sheets

(51) Int. Cl.
*F16J 15/00* (2006.01)
*F04C 15/00* (2006.01)

(56) References Cited

U.S. PATENT DOCUMENTS

| | | | | |
|---|---|---|---|---|
| 3,296,977 A | | 1/1967 | Kinnamon | |
| 3,622,212 A | * | 11/1971 | Laumont | F04C 15/0088 384/398 |
| 4,087,216 A | * | 5/1978 | Shumate | F04C 2/088 418/131 |
| 4,418,556 A | * | 12/1983 | Galle | B21D 26/045 29/421.1 |
| 5,076,770 A | * | 12/1991 | Dabling | F04C 2/088 418/1 |
| 5,252,047 A | * | 10/1993 | Joy | F04C 15/0026 418/132 |
| 5,417,556 A | * | 5/1995 | Waddleton | F04C 15/0026 418/132 |
| 6,716,010 B2 | * | 4/2004 | Eaton | F01C 21/02 418/132 |
| 6,997,689 B2 | * | 2/2006 | Lafferty | F04C 2/086 29/888.021 |
| 8,944,793 B2 | * | 2/2015 | Ni | F16H 1/06 418/206.5 |
| 8,998,496 B2 | | 4/2015 | Alexander et al. | |
| 9,488,174 B2 | * | 11/2016 | Kovach | F04C 2/165 |
| 9,683,565 B2 | * | 6/2017 | Bredenfeld | F04C 2/086 |
| 9,874,208 B2 | * | 1/2018 | Veilleux, Jr. | B23K 26/34 |
| 2008/0240968 A1 | * | 10/2008 | Chiu | F04C 2/18 418/206.7 |
| 2019/0024657 A1 | * | 1/2019 | George | F04C 2/088 |
| 2019/0178245 A1 | * | 6/2019 | Poteet | F04C 2/18 |

FOREIGN PATENT DOCUMENTS

| | | | |
|---|---|---|---|
| EP | 2657525 A2 | 10/2013 | |
| GB | 1055517 A | 1/1967 | |
| JP | 6406281 B2 * | 10/2018 | F04C 2/18 |
| WO | 9407030 A1 | 3/1994 | |

\* cited by examiner

BEARING WITH AN ECCENTRIC SEAL GROOVE

BACKGROUND

Technological Field

The present disclosure relates to a pump bearing, and more particularly to a pump bearing having eccentric seal grooves.

Description of Related Art

Gear pumps typically include a housing or plate that holds a set of intermeshing gears. As the gears turn, fluid moves between the gear teeth and the housing and is expelled from the pump due to the intermeshing of the gears. The gears are attached or mounted to shafts that run axially from the gear faces, and these shafts must run on one or more bearing surfaces.

A conventional bearing arrangement in pumps involves using two separate bearings, one for the drive side and one for the driven side. Such an arrangement can lead to high internal leakages within the pump which causes inefficiencies in size, and power because of the increased size required to compensate for the internal leakages. This conventional two piece bearing arrangement is also difficult to seal to prevent the internal losses because of the fact that there are two separate pieces touching and any surface discontinuities between the two parts, such as could be caused by a seal, only serves to increase the leakages. A single piece bearing encompassing both the drive and driven side bores has a geometry that is easier to seal. However, the single piece bearing geometry can introduce alignment issues due to the tolerancing on the housing bore and the bearing outer profile. The present disclosure may provide a solution for one of these remaining challenges.

SUMMARY OF THE INVENTION

A pump bearing for use in a gear pump includes a top face, a side face perimetrically surrounding the top face, a bottom face opposed to the top face, a first bearing bore projecting from the top face to the bottom face defining an axis and configured to contain a drive-side shaft, and a groove within the side face located between the top face and the bottom face a variable depth in a direction perpendicular to the axis configured to a receive seal. The groove can include a depth variance into the side face of between 0.0002 and 0.01 inches.

The top face of the pump bearing can be elongated along a primary axis. A second bearing bore can be projecting from the top face to the bottom face configured to contain a driven-side shaft.

The side face can include a first straight section and a second straight section opposing the first straight section, and a pair of opposing rounded sections connecting each of the straight section. The depth of the groove along the first straight section can be greater than the depth along the second straight section and the depth of the groove along each of the rounded section can increase from the second straight section to the first section. The depth of the groove along a rounded portion of a drive side can be deeper than along a rounded portion of a driven side. The groove can be located in the top half of the top face and the groove can encircle the side face. A second groove having a variable depth can be located below the first groove.

The bearing can reside within a housing. The bearing can be partially biased to an inlet side of the housing in an unloaded condition, wherein the inlet side is tangential to the first side of the fuel pump bearing and be fully biased to the inlet side of the housing in a loaded condition.

A pressure balance groove can surround an angular portion of the first bearing bore and an angular portion of the second bearing bore, wherein the surrounded angular portion of the second bearing bore is longer than the surrounded angular portion of the first bearing bore, wherein the pressure groove surrounding the angular portion of the second bearing bore can extend between 2 and 5 degrees further with respect to a centerline of the top face in a counter-clockwise direction than the pressure groove surrounding the angular portion of the first bearing bore extends with respect to the centerline of the top face in the clockwise direction.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
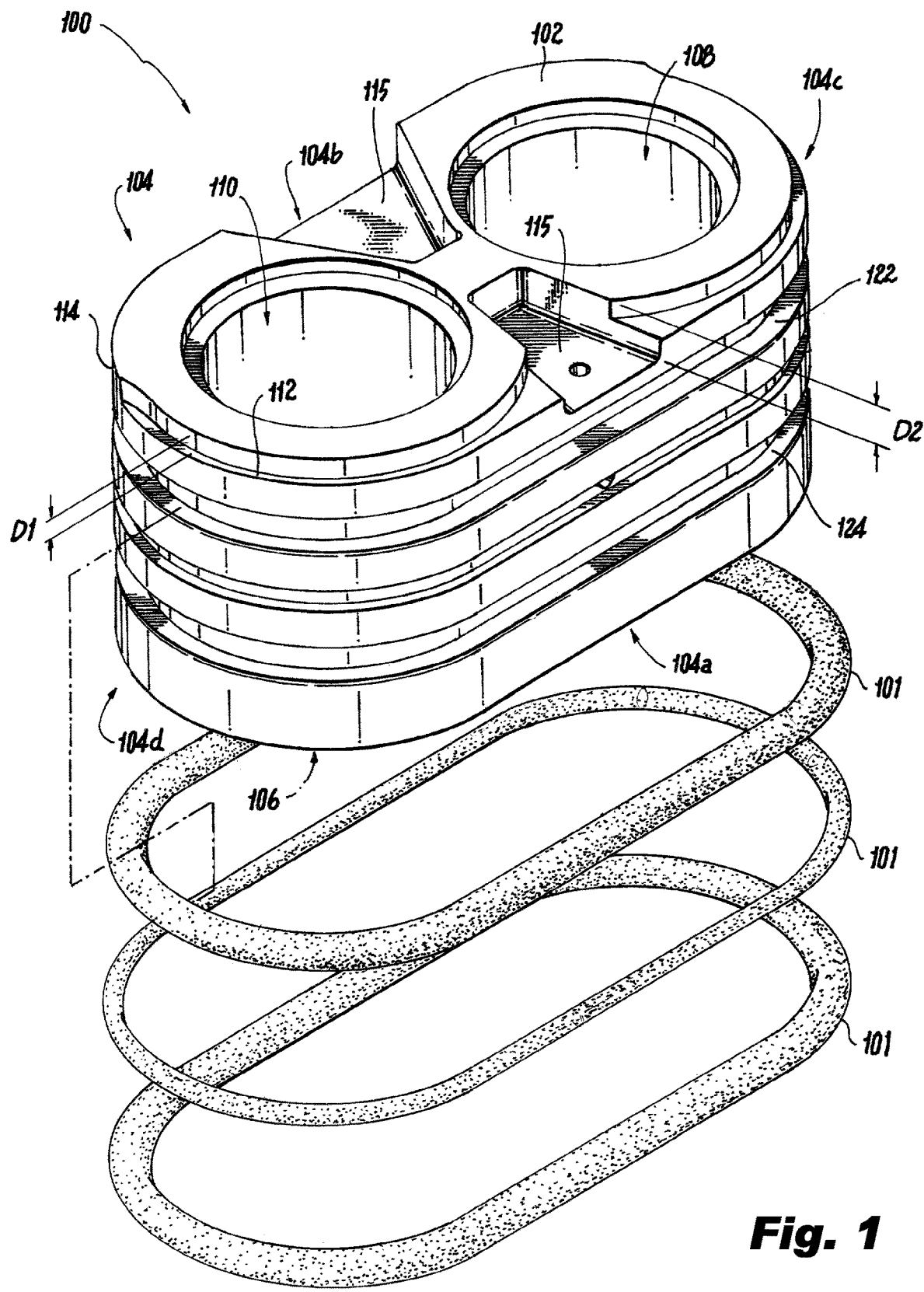
FIG. 1 is a perspective view of a pump bearing.

Reference will now be made to the drawings wherein like reference numerals identify similar structural features or aspects of the subject invention. For purposes of explanation and illustration, and not limitation, a partial view of an exemplary embodiment of a fuel pump bearing in accordance with the invention is shown in FIG. 1 and is designated generally by reference numeral 100. Other embodiments of the fuel pump bearing in accordance with the invention, or aspects thereof, are provided in FIGS. 2-6, as will be described. The methods and systems of the invention can be used to bias the bearing to a housing wall during installation and during operation.

FIG. 1 shows a fuel pump bearing 100, elongated along a primary axis, for use in a gear pump including a top face 102, a side face 104 peripherally encircling the top face 102, a bottom face 106 opposed to the top face 102, a first bearing bore 108 projecting from the top face 102 to the bottom face 106 configured to contain a drive-side shaft, a second bearing bore 110 to contain a driven-side shaft. The side face 104 includes a first straight section 104a and a second straight section 104b opposing the first straight section 104a, and a pair of opposing rounded sections 104c/d connecting each of the straight sections 104a/104b.

Figure 2:
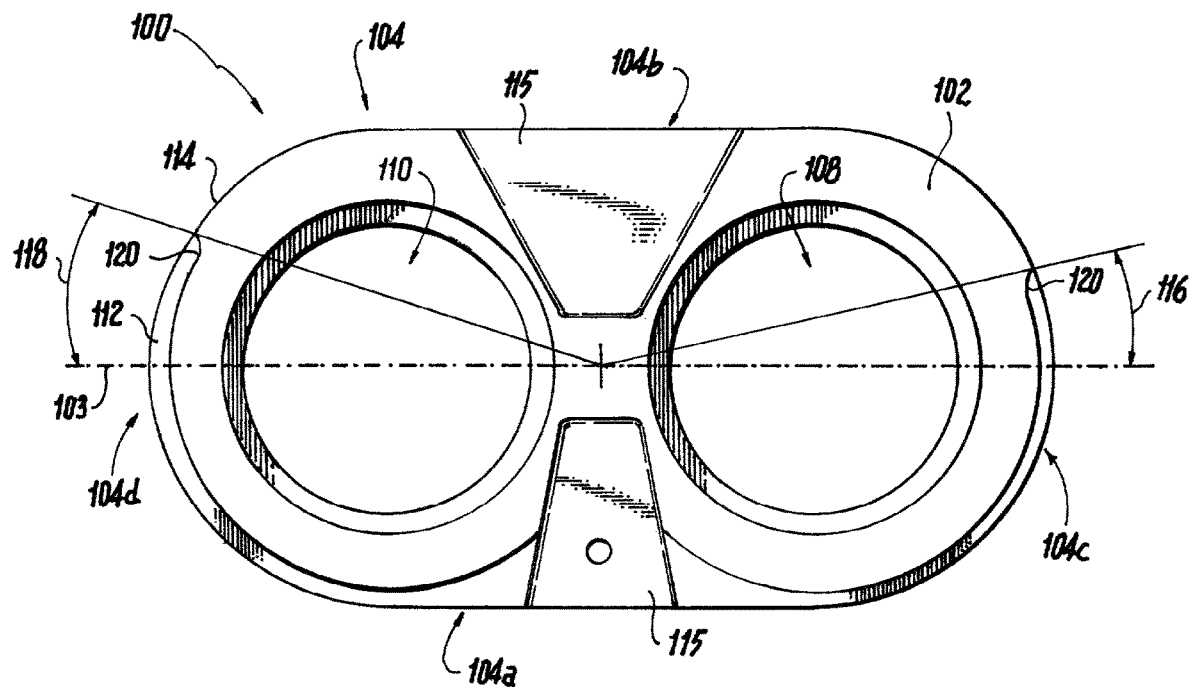
FIG. 2 is a top view of FIG. 1, showing the eccentric pressure balance groove.

Referring to FIG. 2, an eccentric pressure balance groove 112 defined within a portion of the edge 114 of the top face 102 and the side face 104 defining first depth D1 from the top face 102. The top face 102 includes two recesses (inlet and discharge sides) 115 having a depth D2. The depth D2 of the recesses which may be greater than, less than, or equal to the first depth D1 of the eccentric pressure groove 112. The pressure balance groove 112 surrounds an angular portion 116 of the first bearing bore 108 and an angular portion 118 of the second bearing bore 110, wherein the surrounded angular portion 118 of the second bearing bore is longer than the surrounded angular portion 116 of the first bearing bore 108. The pressure groove surrounding the angular portion 116 of the first bearing bore extends to approximately 30 degrees with respect to a centerline 103 of the top face 102 in a clockwise direction and extends greater than 30 degrees with respect to the centerline 103 in a counter-clockwise direction. The degree to which the pressure groove 118 extends can be extended according to the requirements of the application. The pressure groove surrounding the angular portion of the second bearing bore 118 extends beyond 30 degrees with respect to the centerline 103 of the top face 102 in a counter-clockwise direction and greater than 30 degrees in the clockwise direction. Further, the pressure groove surrounding the angular portion of the second bearing bore 110 extends between 2 and 5 degrees further with respect to the centerline 103 counter-clockwise direction than the pressure groove surrounding the angular portion 116 of the first bearing bore 108 extends with respect to the centerline 103 in the clockwise direction. The pressure groove surrounding the portion 118 of the second bearing bore 112 includes a tapered end 120 and the pressure groove surrounding the portion 116 of the first bearing bore 110 includes a tapered end 120. It is also considered that the ends 120 could include a 90° cut, a radius, a chamfer style. The eccentric groove 112 results in hydraulic loads that are used to ensure a contact point between the pump bores 108,110.

Figure 3:
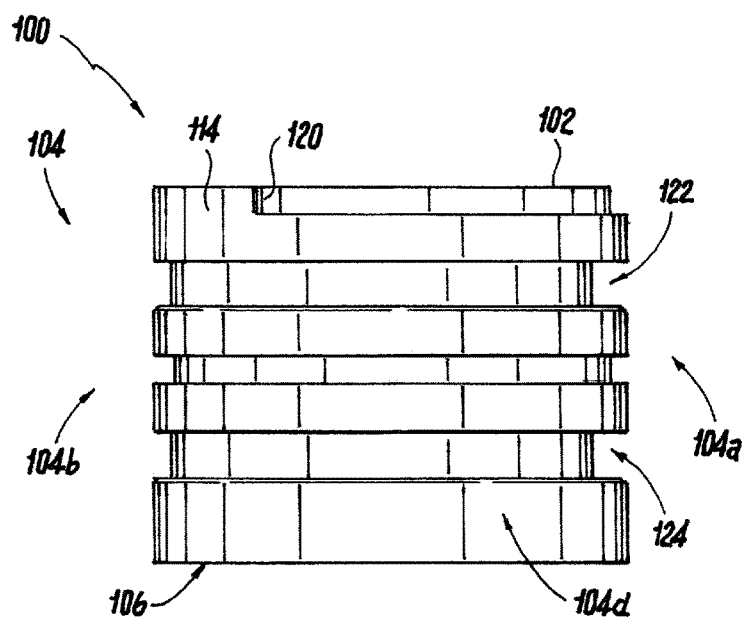
FIG. 3 is a side view of FIG. 1, showing the eccentric seal grooves.

Referring to FIG. 3, a first variable seal groove 122 within the side face 104 located between the top face 102 and the bottom face 106 with variable depth into the bottom face is meant to receive a seal. The depth variance into the side face is preferred to be between 0.0002 and 0.01 inches. The depth of the first variable seal groove 122 along the first straight section 104a is greater than the depth along the second straight section 104b. The depth of the first variable seal groove 122 along each of the rounded sections 104c/d increases from the second straight section 104b to the first section 104a. The first variable seal groove 122 is located in the top half of the top face 102 and encircles the entire side face 104a. The side face 104 also includes a second variable seal groove 124 having a located below the first seal groove 122. The eccentricity of the two seal grooves 122 and 124 help avoid tipping and alignment issues. When a seal 101 having a constant width is positioned within the first groove, the seal groove helps ensure a predetermined contact area between the housing bores and the bearing. This helps designers align centerlines of the driveline, pump bores, and bearing bores during the design phase.

Figure 4:
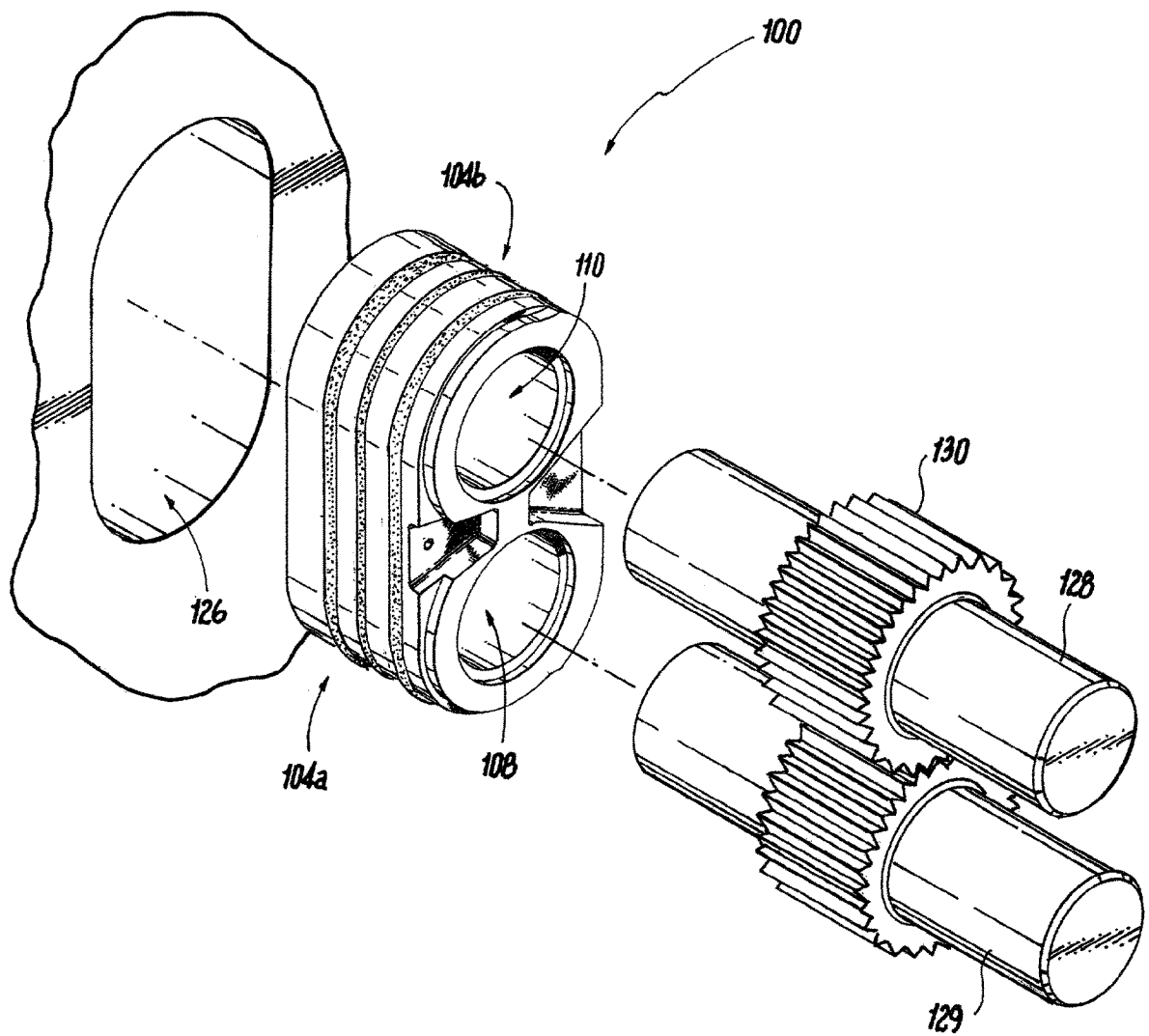
FIG. 4 is a perspective view of a pump bearing including shafts and gears.
Figure 5:
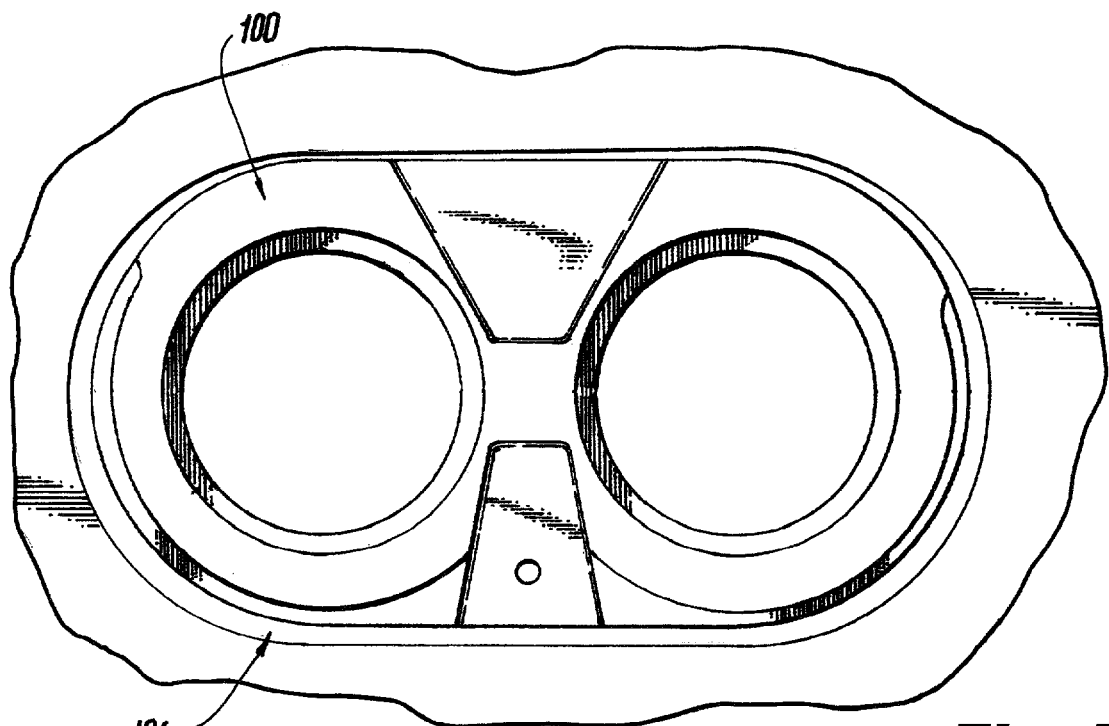
FIG. 5 is a top view of the bearing of FIG. 1, in the housing in an unloaded condition.

Referring to FIG. 4, fuel pump bearing 100 resides in a housing 126, a drive shaft 128 extends through the first bore 108 and a driven shaft 129 extends through the second bore 108 and a gear 130 located on each of the on each of the shafts 128/129. As shown in FIG. 5, the fuel pump bearing 100 is partially biased to an inlet side of the housing 100 in an unloaded condition due to the seal grooves 122 and 124.

Figure 6:
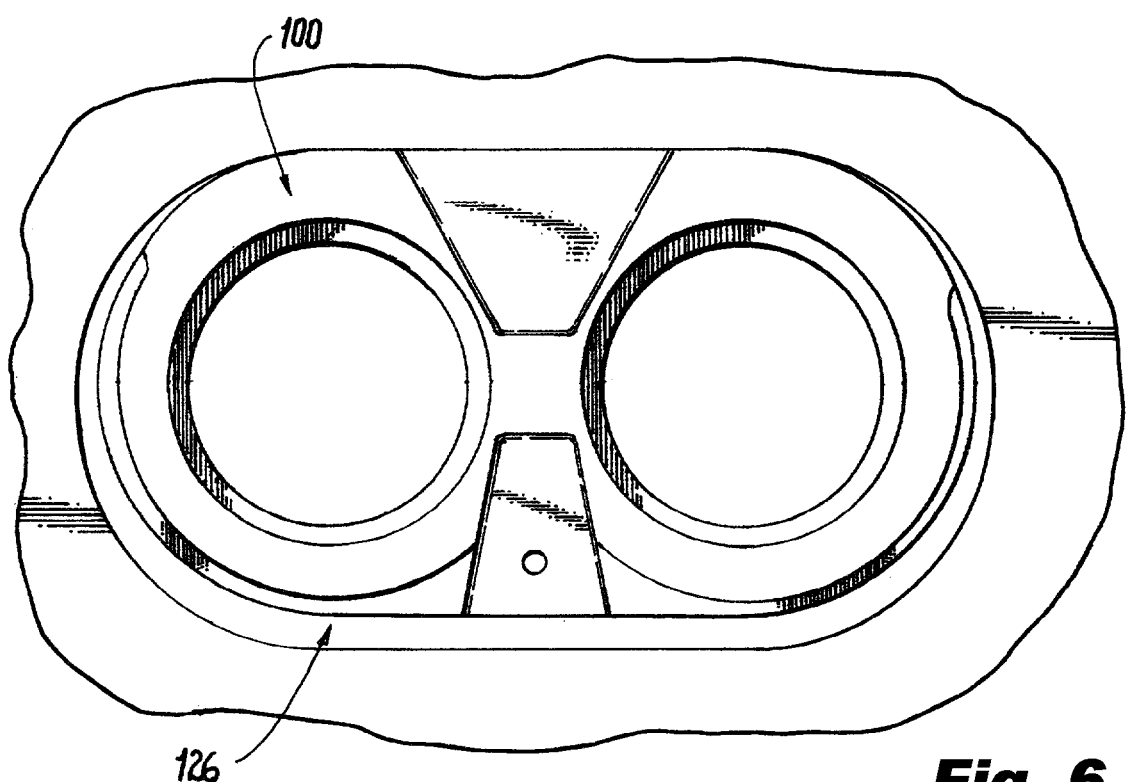
FIG. 6 is a top view of the bearing of FIG. 1, in the housing in a loaded condition.

The variable seal grooves 122 and 124 bias the bearing 100 to the housing wall on the drive side using the spring-like quality of the seal material before operation begins and during start to help aid in alignment. Further, before operating, as shown in FIG. 5, the asymmetric pressure balance grooves 112 are not contributing because there is no pressure across the bearings. As shown in FIG. 6, the fuel pump bearing is fully biased to the inlet side of the housing 126 in a loaded condition. The asymmetric pressure balance groove 112 biases the bearing to the housing wall on the drive side by directing the resultant pressure load from the pressures acting on the pump during operation as shown in FIG. 6. The resultant pressure loads developed by pumping the fluid are directed toward a given spot by controlling how far the pressure balance groove extends along the outer perimeter of the bearing. The resultant combined asymmetric hydraulic load can thus be directed so as to push the bearing towards the desired contact point within the housing. The first variable seal groove 122 and the eccentric balance groove 112 discussed above can also be applied independently to conventional two piece bearings and to single piece bearings.

The methods and systems of the present disclosure, as described above and shown in the drawings provide for pump bearings with superior properties including increased reliability and stability. While these concepts are both targeted towards aerospace fuel pumping applications, both are applicable to other pumps regardless of the fluid used or the end use of the pumps. While the apparatus and methods of the subject disclosure have been shown and described with reference to specific embodiments, those skilled in the art will readily appreciate that changes and/or modifications, such as reversing the positions of the first and second bearing bores, may be made thereto without departing from the spirit and scope of the subject disclosure.

What is claimed is:

1. A pump bearing for use in a gear pump, comprising:
    a top face;
    a side face perimetrically surrounding the top face;
    a bottom face opposed to the top face;
    a first bearing bore projecting from the top face to the bottom face defining an axis and configured to contain a drive-side shaft; and
    a groove within the side face located between the top face and the bottom face, the groove having a variable depth in a direction perpendicular to the axis configured to a receive seal, wherein the side face includes a first straight section and a second straight section opposing the first straight section, and a pair of opposing rounded sections connecting each of the straight section, and wherein the depth of the groove along the first straight section is greater than the depth along the second straight section.

2. The bearing of claim 1, wherein the groove includes a depth variance into the side face of between 0.0002 and 0.01 inches.

3. The bearing of claim 1, wherein the top face is elongated along a primary axis.

4. The bearing of claim 1, further comprising a second bearing bore projecting from the top face to the bottom face configured to contain a driven-side shaft.

5. The bearing of claim 1, wherein the groove is located in the top half of the top face.

6. The bearing of claim 1, wherein the groove encircles the side face.

7. The bearing of claim 1, wherein groove is a first groove and the side face includes a second groove having a variable depth located below the first groove.

8. A pump bearing for use in a gear pump, comprising:
a top face;
a side face perimetrically surrounding the top face;
a bottom face opposed to the top face;
a first bearing bore projecting from the top face to the bottom face defining an axis and configured to contain a drive-side shaft; and
a groove within the side face located between the top face and the bottom face the groove having a variable depth in a direction perpendicular to the axis configured to a receive seal, wherein the side face includes a first straight section and a second straight section opposing the first straight section, and a pair of opposing rounded sections connecting each of the straight section, wherein the depth of the groove along each of the rounded section increases from the second straight section to the first section.

9. A pump bearing for use in a gear pump, comprising:
a top face;
a side face perimetrically surrounding the top face;
a bottom face opposed to the top face;
a first bearing bore projecting from the top face to the bottom face defining an axis and configured to contain a drive-side shaft; and
a groove within the side face located between the top face and the bottom face, the groove having a variable depth in a direction perpendicular to the axis configured to a receive seal, wherein the side face includes a first straight section and a second straight section opposing the first straight section, and a pair of opposing rounded sections connecting each of the straight section, wherein the depth of the groove along a rounded portion of a drive side is deeper than along a rounded portion of a driven side.

10. A pump bearing system comprising:
a top face;
a side face circumferentially encircling the top face;
a bottom face opposed to the top face;
a first bearing bore projecting from the top face to the bottom face configured to contain drive-side shaft; and
a first groove within the side face having located between the top face and the bottom face a variable depth configured to a receive seal; and
a seal having a constant width positioned within the first groove;
wherein the side face includes a first straight section and a second straight section opposing the first straight section, and a pair of opposing rounded sections connecting each of the straight section, and wherein the depth of the groove along the first straight section is greater than the depth along the second straight section.

11. The pump bearing system of claim 10, wherein the fuel pump bearing resides in a housing.

12. The pump bearing system of claim 11, wherein the pump bearing is partially biased to an inlet side of the housing in an unloaded condition, wherein the inlet side is tangential to the first side of the fuel pump bearing.

13. The pump bearing system of claim 11, wherein the pump bearing is fully biased to the inlet side of the housing in a loaded condition.

14. The bearing of claim 11, wherein the side face includes a seal groove having a constant depth.

15. The bearing of claim 11, wherein the side face includes a seal groove having a variable depth.

16. A pump bearing system comprising:
a top face;
a side face circumferentially encircling the top face;
a bottom face opposed to the top face;
a first bearing bore projecting from the top face to the bottom face configured to contain drive-side shaft; and
a first groove within the side face having located between the top face and the bottom face a variable depth configured to a receive seal;
an edge defined where the top face meets the side face;
an asymmetric pressure balance groove, having tapered ends, defined within a portion of the edge of the top face and the side face defining first depth from the top face;
a housing for housing the pump bearing;
a drive shaft extending through the first bore and a driven shaft extending through the second bore; and
a gear located on each of the shafts, wherein the pressure balance groove surrounds an angular portion of the first bearing bore and an angular portion of the second bearing bore, wherein the surrounded angular portion of the second bearing bore is longer than the surrounded angular portion of the first bearing bore.

17. A pump bearing system comprising:
a top face;
a side face circumferentially encircling the top face;
a bottom face opposed to the top face;
a first bearing bore projecting from the top face to the bottom face configured to contain drive-side shaft; and
a first groove within the side face having located between the top face and the bottom face a variable depth configured to a receive seal;
an edge defined where the top face meets the side face;
an asymmetric pressure balance groove, having tapered ends, defined within a portion of the edge of the top face and the side face defining first depth from the top face;
a housing for housing the pump bearing;
a drive shaft extending through the first bore and a driven shaft extending through the second bore; and
a gear located on each of the shafts, wherein the pressure groove surrounding the angular portion of the second bearing bore extends between 2 and 5 degrees further with respect to a centerline of the top face in a clockwise direction than the pressure groove surrounding the angular portion of the first bearing bore extends with respect to the centerline of the top face in the counter clockwise direction.

18. A pump bearing system comprising:
a top face;
a side face circumferentially encircling the top face;
a bottom face opposed to the top face;
a first bearing bore projecting from the top face to the bottom face configured to contain drive-side shaft; and
a first groove within the side face having located between the top face and the bottom face a variable depth configured to a receive seal; and
a seal having a constant width positioned within the first groove, wherein the depth of the groove along each of the rounded section increases from the second straight section to the first section.

19. A pump bearing system comprising:
a top face;
a side face circumferentially encircling the top face;
a bottom face opposed to the top face;
a first bearing bore projecting from the top face to the bottom face configured to contain drive-side shaft; and a first groove within the side face having located between the top face and the bottom face a variable depth configured to a receive seal; and a seal having a constant width positioned within the first groove, wherein the depth of the groove along a rounded portion of a drive side is deeper than along a rounded portion of a driven side.

\* \* \* \* \*